United States Patent [19]
Ludwig

[11] 3,966,492
[45] June 29, 1976

[54] SODIUM SULFUR BATTERY OR CELL WITH IMPROVED AMPERE-HOUR CAPACITY

[75] Inventor: Frank A. Ludwig, Southfield, Mich.

[73] Assignee: Ford Motor Company, Dearborn, Mich.

[22] Filed: Aug. 20, 1975

[21] Appl. No.: 605,941

[52] U.S. Cl............................. 136/6 FS; 136/100 R
[51] Int. Cl.² ........................................ H01M 43/00
[58] Field of Search........... 136/6 FS, 6 F, 20, 83 R, 136/83 F, 100 R, 153

[56] References Cited
UNITED STATES PATENTS

| | | | |
|---|---|---|---|
| 3,413,150 | 11/1968 | Kummer et al..................... | 136/6 FS |
| 3,468,709 | 9/1969 | Kummer.............................. | 136/6 F |
| 3,811,943 | 5/1974 | Minck et al. ...................... | 136/6 FS |

Primary Examiner—Anthony Skapars
Attorney, Agent, or Firm—Roger L. May; Keith L. Zerschling

[57] ABSTRACT

An improved secondary battery or cell of the type having: (A) one or more anodic reaction zones containing a molten alkali metal reactant-anode in electrical contact with an external circuit; (B) one or more cathodic reaction zones containing (1) a cathodic reactant which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant and (2) an electrode of porous conductive material which is at least partially filled with said cathodic reactant; and (C) a cation-permeable barrier to mass liquid transfer interposed between and in contact with said anodic and cathodic reaction zones, said porous conductive material being in electrical contact with both said cation-permeable barrier and an external circuit. The improvement comprises: (a) employing a porous conductive material which will wick both sulfur and alkali metal polysulfides and which, in different regions of said cathodic reaction zone exhibits different degrees of wettability by said alkali metal polysulfides, said material in a region adjacent to said cation-permeable barrier being more readily wetted by said polysulfides than is said material in a region further removed from said barrier such that sulfur will boil near said barrier and condense away from it; (b) disposing said porous conductive material within said cathodic reaction zone such that it forms and encloses one or more channels which extend from said region adjacent said cation-permeable barrier outwardly into said region of said cathodic reaction zone which is further removed from said barrier; and (c) maintaining the amount of molten cathodic reactant within said cathodic reaction zone such that said channels remain free of said molten reactant and are thus adapted to transport sulfur vapor.

12 Claims, 3 Drawing Figures

SODIUM SULFUR BATTERY OR CELL WITH IMPROVED AMPERE-HOUR CAPACITY

The invention herein described was made in the course of or under a contract or subcontract thereunder with the National Science Foundation.

This application relates to an improved secondary cell or battery of increased ampere-hour capacity.

More particularly, this application relates to an improved secondary cell or battery of the type comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

This application still more particularly relates to an improved sodium sulfur battery or cell of increased ampere-hour capacity.

BACKGROUND OF THE INVENTION

A recently developed type of secondary or rechargeable electrical conversion device comprises: (1) an anodic reaction zone containing a molten alkali metal anode-reactant, e.g., sodium, in electrical contact with an external circuit; (2) a cathodic reaction zone containing (a) a cathodic reactant comprising a liquid electrolyte, e.g., sulfur or a mixture of sulfur and molten polysulfide, which is electrochemically reversibly reactive with said anodic reactant, and (b) a conductive electrode which is at least partially immersed in said cathodic reactant; and (3) a solid electrolyte comprising a cation-permeable barrier to mass liquid transfer interposed between and in contact with said anodic and cathodic reaction zones. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the surface of the porous electrode by reaction of the cathodic reactant with electrons conducted through the porous electrode from the external circuit. Because the ionic conductivity of the liquid electrolyte is less than the electronic conductivity of the porous electrode material, it is desirable during discharge that both electrons and sulfur be applied to and distributed along the surface of the porous conductive material in the vicinity of the cation-permeable solid electrolyte. When the sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the porous electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the porous electrode, charge transfer is inhibited and the charging process is greatly hindered or terminated. Thus, in order to improve the rechargeability of a cell of this type it is necessary not only to supply polysulfide to the surface of the porous electrode in the vicinity of the cation-permeable membrane, but also to remove sulfur therefrom.

U.S. Pat. No. 3,811,493 and U.S. Pat. application Ser. No. 545,048 filed Jan. 29, 1975 both disclose energy conversion device designs which allow or promote improved mass transportation of reactants and reaction products to and from the vicinity of the solid electrolyte and the porous electrode during both discharge and charge. In the device disclosed in the patent an ionically conductive solid electrolyte is located between a first reactant in one container and a second reactant in another container. An electrode for one of the reactants comprises a layer of porous, electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive member distributes electrons to the porous, conductive material which in turn transfers electrons to or from the reactants.

The improvement disclosed in the patent application comprises designing the cathodic reaction zone of the device such that there are a plurality of channels and/or spaces within said zone which are free of porous conductive electrodes and which are thus adapted to allow free flow of the molten cathodic reactants during operation of the device. This flow results from free convection within the channels and/or spaces, and from wicking of cathodic reactants within the conductive porous material.

U.S. Pat. application Ser. No. 567,464 filed Apr. 14, 1975 discloses an improved method for recharging secondary batteries or cells of the above-described type. The process involves maintaining a temperature gradient within the cathodic reaction zone during recharging such that the temperature of the cathodic reactants in a first region adjacent the solid electrolyte or cation-permeable barrier is sufficiently higher than the temperature of said reactants in a second region not adjacent the barrier such that sulfur in the first region vaporizes and is transported to said second region where it condenses.

The prior art designs disclosed and claimed in the aforementiond U.S. Patent and in Ser. No. 545,048 are effective in promoting distribution of reactants during both discharge and charge. However, even with these improved designs it is difficult to recharge the cells or batteries at high rates. The process of Ser. No. 567,464 overcomes recharging problems of the devices discussed above, but requires that heating means be employed to provide the necessary temperature gradients.

The improved device of this invention, like the process of Ser. No. 567,464 increases the ampere-hour capacity of the batteries or cells by promoting vapor transfer of sulfur within the cathodic reaction zone during recharging. Unlike the prior art process, however, the recharging device requires no temperature gradient and, thus, no additional external heating elements. Also, unlike the prior art process, the improved device of the invention is designed to provide specific channels for vapor transfer of sulfur within the cathodic reaction zone.

BRIEF DESCRIPTION OF THE INVENTION

The improvement of this invention relates to a modification of the structure of the prior art alkali metal/sulfur-polysulfide secondary battery or cell, which will be described hereinafter in greater detail, in order to increase vapor transfer of sulfur within the cell or battery and thereby increase the ampere-hour capacity of the device. The improvement comprises: (a) employing a porous conductive electrode within the cathodic reaction zone of the cell or battery which will wick both sulfur and alkali metal polysulfides and which, in different regions of said cathodic reaction zone, exhibits different degrees of wettability by said alkali metal polysulfide, said electrode in a region adjacent to said cation-permeable barrier being more readily wetted by said polysulfide than is said electrode in a region further removed from said barrier such that sulfur will boil near said barrier and condense away from it; (b) disposing the porous conductive electrode within the cathodic reaction zone of the cell or battery such that it forms and encloses one or more channels which extend from said region adjacent the cation-permeable barrier of the cell or battery outwardly into said region of the cathodic reaction zone which is further removed from the cation-permeable barrier, and (c) maintaining the amount of molten cathodic reactant in the cathodic reaction zone of the cell or battery such that the channels therein remain free of molten reactant are thus adapted to transport sulfur vapor.

The invention will be more fully understood after reading the following detailed description thereof in conjunction with the drawings in which.

DETAILED DESCRIPTION OF THE INVENTION

Figure 1:
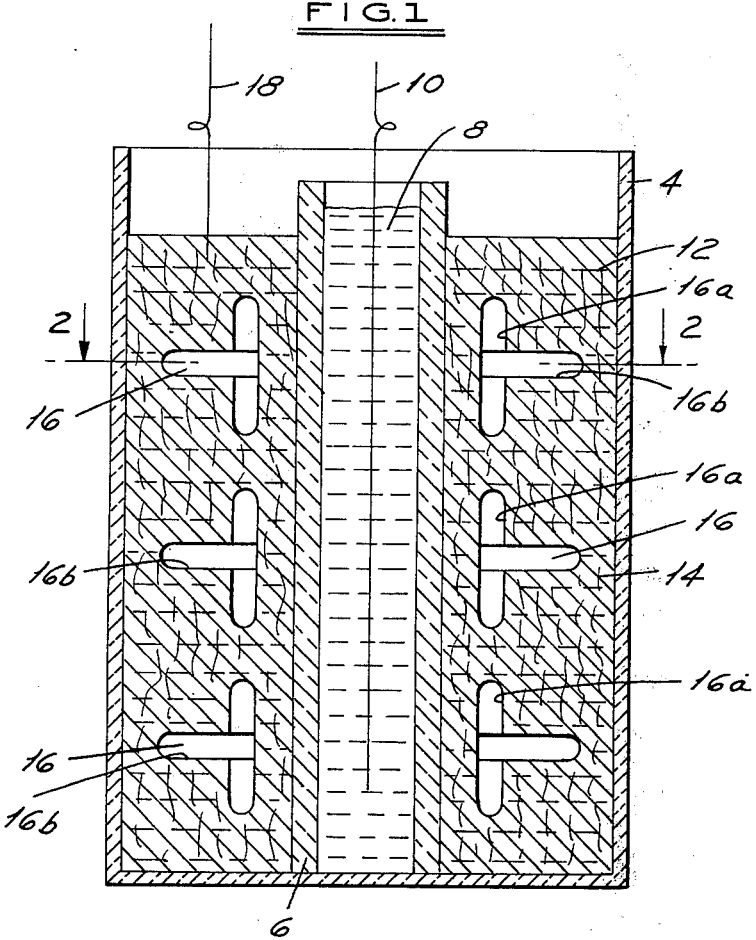
FIG. 1 shows a vertical sectional view of a cell showing a preferred cathodic reaction zone design for use in the improved cell or battery of the invention.

Description of Device to which Improvement Applies

The secondary or rechargeable electrical conversion devices to which the improvement of this invention applies and various components thereof are disclosed in the following United States patents, the disclosures of which are incorporated herein by reference: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531 and 3,811,493.

As mentioned above, the secondary batteries or cells to which the improvement of this invention applies comprise generally: (1) an anodic reaction zone containing a molten alkali metal reactant-anode in electrical contact with an external circuit; (2) a cathodic reaction zone containing (a) a cathodic reactant comprising a liquid electrolyte selected from sulfur or a mixture of sulfur and sulfur saturated polysulfide of said molten alkali metal reactant which is electrochemically reversibly reactive with said anodic reactant and (b) an electrode of porous conductive material which is at least partially immersed in said cathodic reactant and (3) a cation-permeable barrier to mass liquid transfer interposed between and in contact with said anodic and cathodic reaction zones, said porous conductive material being in electrical contact with both said cation-permeable barrier and the external circuit.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

The cathodic reactant is a molten material, e.g., molten sulfur, which is electrochemically reversibly reactive with the anodic reactant. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

Since in the fully discharged state the polysulfide melt is single phase in nature, the activity of sulfur in the melt is substantially less than unity when the mole fraction of sulfur is about 0.60 and approaches unity as the mole fraction approaches 0.72, the point at which the polysulfide is sulfur saturated. As the cell is recharged, elemental sulfur is formed momentarily on the surfaces of the porous electrode in the vicinity of the solid ceramic electrolyte. Since sulfur is nonconductive, the presence of elemental sulfur on the porous electrode could cause difficulty in continuing the recharging process. However, when the mole fraction of sulfur in the melt is between about 0.60 and about 0.72, i.e., the single phase region, the sulfur which forms on the surface of the porous electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltage becomes constant.

As charging of the cell or battery continues, the sulfur saturated polysulfide will no longer react with elemental sulfur deposited on the porous electrode to form polysulfide having a greater mode ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficulties are confronted because of the formation of large amounts of nonconductive elemental sulfur on porous electrode surfaces. In fact, it is extremely difficult to recharge such secondary cells or batteries to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700°F.

The polycrystalline ceramic materials useful as reaction zone separators or solid electrolytes are bi- or multi-metal oxides. Among the polycrystalline bi- or multi-metal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al—O bond chains with sodium ions occupying sites between the aforementioned layers and columns. Among the numerous polycrystalline Beta-type-alumina materials useful as reaction zone separators or solid electrolytes are the following:

1. Standard Beta-type-alumina which exhibits the above-discussed crystalline structure comprising a series of layers of aluminum oxide held apart by layers of linear Al—O bond chains with sodium occupying sites between the afore-mentioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one crystalline form which may be represented by the formula $Na_2O.11Al_2O_3$. The second crystalline is $\beta''$-alumina which may be represented by the formula $Na_2O.6Al_2O_3$. It will be noted that the $\beta''$ crystalline form of Beta-type-alumina contains approximately twice as much soda (sodium oxide) per unit weight of material as does the Beta-alumina. It is the $\beta''$-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent.

The cathodic electrode or porous conductive material is in electrical contact with the cation-permeable barrier and an external circuit. The conductive material is of significantly greater surface area than a solid cathode and may comprise any porous material which is electronically conductive and which is resistant to attack by reactants within the cathodic reaction zone. Among the materials which may be employed are felts or foams of graphite or vitreous carbons.

While the secondary cells or batteries to which the improvement of this invention is applicable may have a number of different configurations, several of which are disclosed in the above-incorporated patents, a preferred configuration comprises: (1) a container, preferably tubular; (2) a cation-permeable barrier to mass liquid transfer, preferably tubular, which is disposed within said container so as to create an anodic reaction zone within said barrier and a cathodic reaction zone between said barrier and said container; (3) a molten alkali metal anodic reactant within said anodic reaction zone in electrical contact with an external electrical circuit; (4) a cathodic reactant comprising a liquid electrolyte which is electrochemically reversibly reactive with said anodic reactant and which, in at least the partially discharged state is selected from the group consisting of (a) a single phase composition comprising molten polysulfide salts of said anodic reactant and (b) a two phase composition comprising molten sulfur and molten sulfur saturated polysulfide salts of said anodic reactant; and (5) an electrode of porous conductive material which is disposed within said cathodic reaction zone, filled at least in part with said cathodic reactant and is in electrical contact with both said barrier and said external circuit. Such secondary cells which are preferably tubular or cylindrical, thus comprise cathodic reaction zones which completely surround the solid electrolyte or reaction zone separator.

Improvement of the Invention

The improved cells or batteries in accordance with the invention serve to overcome difficulties caused by formation of elemental sulfur on the porous electrode surface near the solid ceramic electrolyte. The improvement comprises constructing the cathodic reaction zone of the cell or battery by: (a) employing a porous conductive material which will wick both sulfur and alkali metal polysulfides and which, in different regions of said cathodic reaction zone exhibits different degrees of wettability by said alkali metal polysulfide, said material in a region adjacent to said cation-permeable barrier being more readily wetted by said polysulfide than is said material in a region further removed from said barrier such that sulfur will boil near said barrier and condense away from it; (b) disposing said porous conductive material within said cathodic reaction zone such that it forms and encloses one or more channels which extend from said region adjacent the cation-permeable barrier outwardly into said region of the cathodic reaction zone which is further removed from the barrier; and (c) maintaining the amount of molten cathodic reactant within the cathodic reaction zone such that the channels remain free of the molten reactant and are thus adapted to transport sulfur vapor.

As mentioned above, when the battery or cell is being charged sulfur forms on the surface of the porous electrode near the cation-permeable ceramic barrier. To a certain extent while the cathodic reactant is one phase in nature the sulfur so formed will react with lower polysulfides in the immediate vicinity to form higher polysulfides. Ideally such sulfur will react readily with all polysulfide in the cell or battery until the ratio of sulfur to alkali metal in the polysulfide is about 5.2:2 and a two phase composition begins to form. Of course, the lower polysulfides must be in the vicinity of the sulfur in order for it to react. To an extent convective flow of reactants within such cells or batteries brings the reactants into sufficient proximity. The improvement of this invention expedites the reaction of sulfur with lower polysulfides while the cathodic reactant is one phase in nature by easily transporting the sulfur throughout the cathodic reaction zone in the vapor state rather than in the viscous liquid state.

Once the cathodic reactant reaches the two phase stage recharging becomes even more difficult because of increased amounts of free insulating sulfur which are present in the cathodic reaction zone. The improvement of this invention also aids in recharging into the two phase stage by removing the insulating sulfur from reaction sites adjacent the cation-permeable barrier.

Since the open channels in the cathodic reaction zone of the improved cells or batteries extend outwardly from a region adjacent the cation-permeable barrier where the sulfur is formed during charging, sulfur will vaporize from the electrode surface, pass through the open region in the absence of a temperature gradient because of chemical reaction and condense in a region of the cell or battery further removed from the barrier. This vapor transfer occurs because the region further from the barrier is filled with polysulfides which have a lower sulfur vapor pressure than sulfur. The sulfur condenses in this region because it readily reacts with lower polysulfides ($Na_2Sx$) chemically to form slightly higher polysulfides ($Na_2Sy, y>x$) which will maintain a low sulfur vapor pressure. This reaction of sulfur with the polysulfides continues until the polysulfide becomes sulfur saturated and the two-phase cathodic reactant begins to form. As the two phase reactant forms, the insulating sulfur still passes in vapor form through the channels to condense in the region further from the cation-permeable barrier because of the different wettabilities of the two regions of porous conductive material. This process continues until substantially all of the polysulfide has been converted to sulfur.

As the sulfur is formed and vaporizes from the electrode surface more polysulfide is wicked into the electrode adjacent to the cation permeable barrier. As mentioned above the electrode should be of a material such that sulfur and polysulfide will be wicked to at least several inches in height. A preferred porous electrode material is porous graphtite felt. However, the graphite felt must be modified so that it is preferentially wet by polysulfide in the region adjacent to the cation-permeable barrier. The unmodified graphite felt is preferentially wet by sulfur and is the desired material for the region further from the barrier. The graphite is modified by coating its surface with materials of polar, or ionic character or with unfilled d-orbitals. Such materials include metal oxides and sulfides. The metals may be chosen from a) Groups I, II and III of the Periodic Table of Elements b) Transition Series Metals and c) tin, lead, antimony and bismuth. Preferably the metal salts or oxides are highly insoluble in the sulfur and polysulfide phases so that redistribution of the coating does not occur. Preferred materials for coating are: aluminum oxide ($Al_2O_3$), molybdenum disulfide ($moS_2$), chromium trioxide ($Cr_2O_3$), lanthanum chromite ($LaCrO_3$), calcium doped lanthanum chromite ($La_{1-x}Ca_xCrO_3$) and antimony pentoxide doped tin oxide ($Sb_2O_5$—$S_nO_2$). These materials are highly insoluble in the two phases. Some other suitable materials, such as $FeS_2$, are somewhat more soluble and therefore less preferable. The materials can be applied to the surface of the graphite felt by methods such as the thermal decomposition of unstable salts such as the nitrates, or by the use of stable inorganic "glues" such as finely dispersed alumina, (an alumina "glue" available commercially is known as "Dispal"). The coating is applied sparingly enough so that it only partially coats the graphite surface. The modified graphite encourages the wicking of polysulfide and the vaporization of sulfur, whereas the unmodified graphite encourages the capillary condensation of sulfur.

Of course, it will be apparent to those skilled in the art that materials other than the preferred graphite felt may be employed as the porous electrode material and that other methods of varying the wetting properties of those materials may be employed.

On discharge of the improved cell or battery of the invention the reverse of the above process occurs. Thus, the sulfur in the region of the cathodic reaction zone removed from the porous electrode has a high vapor pressure and distills across the open region to the discharging electrode next to the cation-permeable barrier where it condenses and reacts with the lower polysulfides. As the discharge continues the accumulating polysulfide is wicked into the region which has been depleted due to the vaporization of sulfur. The polysulfide entering reacts with the sulfur remaining, thereby lowering the vapor pressure of sulfur. The process of distillation occurs as long as a composition difference between the two regions exists, since the vapor pressure from the polysulfides ($Na_2S_5$ and $Na_2S_4$) is significantly higher than the vapor pressure of sulfur over compositions between $Na_2S_2$ and $Na_2S_3$. Thus, the device operates effectively to a full discharge.

Figure 2:
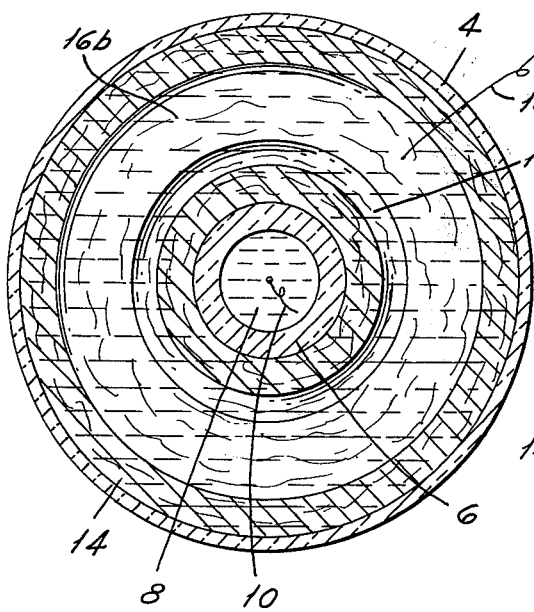
FIG. 2 is a cross-sectional view taken along line 2—2 of FIG. 1.
Figure 3:
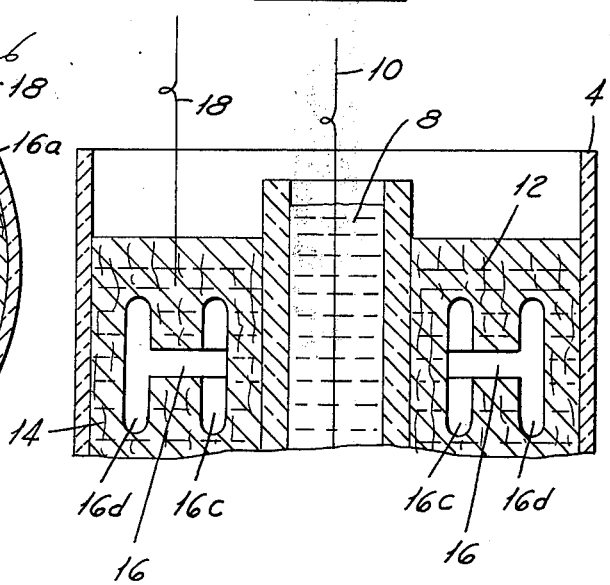
FIG. 3 is a partial vertical sectional view showing a second preferred cathodic reaction zone design.

The drawing shows two preferred designs for cells or batteries embodying the improvement of the invention. The cells shown in FIGS. 1 and 3 comprise: a tubular container 4 which may be in electrical contact with an external circuit; a tubular cation-permeable barrier to mass liquid transfer 6 which is disposed within said tubular container 4 so as to create an anodic zone within the tubular barrier containing a molten alkali metal reactant-anode 8 which is in electrical contact via lead 10 to an external circuit and a cathodic reaction zone between tubular barrier 6 and tubular container 4; a molten cathodic reactant 12 and a porous electrode 14 which is disposed within the cathodic reaction zone so as to form and enclose channels 16 which extend from the region adjacent barrier 6 outwardly to a region removed from said barrier. As will be noted, channels 16 comprise annular openings which are concentrically disposed around barrier 6. A number of such openings may be disposed along the vertical axis of the cell. The annular openings or channels 16 may have different heights at different points within the cathodic reaction zone. For example, the design shown in FIGS. 1 and 2 includes a portion 16a near the barrier 6 of greater height than the remaining portion 16b of the channel 16. The greater height and resultant increased porous electrode surface area contact in portion 16a assists in the transfer of sulfur from the electrode surfaces 14 near barrier 6. FIG. 3 shows an alternative preferred embodiment wherein channels 16 include portions 16c and 16d of greater height to assist in the vapor transfer and condensation of sulfur during charge or discharge.

FIGS. 1 and 3 each show leads 18 which electrically connect porous electrode felt 14 to the external circuit. Of course, it will be recognized by those skilled in the art that electrical contact can be made through container 4 if desired.

The following example is merely intended to be representative of cells which may be prepared and operated in accordance with the teachings of this invention and should not be construed as limiting in any way.

EXAMPLE

A cell similar to that shown in FIG. 1 is constructed using a pyrex container having an inner diameter of 44 mm. A 1 cm O.D. by 3 inch long $\beta''$—$Al_2O_3$ tube, closed at the bottom, is joined to an $\alpha$—$Al_2O_3$ and thence to a Corning No. 7052 glass sodium storage compartment. Graphite felt 2 mm thick is soaked in an aqueous dispersion of Dispal and then dried, the soaking time and concentration of Dispal being controlled to provide a partially covered electrode surface. "Dispal" is the registered trademark of The Continental Oil Company of Peterborough, N.J. referring to a purified $\alpha$—alumina composition comprising:

90% $\alpha$—alumina monohydrate;
9% $H_2O$;
0.5% carbon as primary alcohol;
0.008% silica; and
0.005% iron oxide
0.004% soda
0.005% sulfur The dispersion used in this Example is a 10% aqueous dispersion including 1% concentrated hydrochloric acid. The Dispal treatment modifies the felt to produce preferential wetting by polysulfides with respect to the remainder of the felt in the cell, which is untreated. The remainder of the cell is then filled with ½ inch thick slabs of felt, cut and stacked in such a way as to provide vertical, radial channels and the horizontal annular channels shown in FIGS. 1 and 3. Preferably, to provide rigidity to keep the channels open, the porous materials are made of rigidized graphite felt, porous graphite block or foam; vitreous carbon foam or graphite felt rigidized by coating with vitreous carbon. The horizontal annuli 16 are approximately 2 mm thick, 14 mm I.D. and 32 mm O.D. and are located approximately 8 mm apart. The vertical, radial channels 16c and 16d are likewise approximately 2 mm thick and about 4 mm high, so that about half of the connecting region to the modified felt surrounding the $\beta''$—$Al_2O_3$ is open channel and half unmodified felt. Preferably this open channel construction is to be avoided, by employing a porous graphite of connecting fine pores and connecting macropores so that the sulfur and polysulfide will fill the fine pores only and leave the macropores open. The porous graphite zone is surrounded by a graphite current collector cylinder 3 mm thick (38 mm I.D. × 44 mm O.D.). This cylinder is 20 mm I.D. and at least ⅜ inch high above the porous graphite and $\beta''$—$Al_2O_3$ region in order that a graphite rod or molybdenum wire lead can be cemented thereto and extended to an external circuit. The cell is sealed and filled in the conventional manner and operated at temperatures between 300°C and 400°C.

In view of this disclosure, many modifications of this invention will be apparent to those skilled in the art. It is intended that all such modifications which fall within the scope of this invention be included within the terms of the appended claims.

I claim:

1. In a secondary battery or cell comprising:
   A. one or more anodic reaction zones containing a molten alkali metal reactant-anode in electrical contact with an external circuit;
   B. one or more cathodic reaction zones containing (1) a cathodic reactant which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant and (2) an electrode of porous conductive material which is at least partially immersed in said cathodic reactant; and
   C. a cation-permeable barrier to mass liquid transfer interposed between and in contact with said anodic and cathodic reaction zones, said porous conductive material being in electrical contact with both said cation-permeable barrier and said external circuit, wherein the improvement comprises:
      a. employing a porous conductive material which will wick both sulfur and alkali metal polysulfides and which, in different regions of said cathodic reaction zone exhibits different degrees of wettability by said alkali metal polysulfide, said material in a region adjacent to said cation-permeable barrier being more readily wetted by said polysulfide than is said material in a region further removed from said barrier such that sulfur will boil near said barrier and condense away from it;
      b. disposing said porous conductive material within said cathodic reaction zone such that it forms and encloses one or more channels which extend from said region adjacent said cation-permeable barrier outwardly into the region of said cathodic reaction zone which is further removed from said barrier; and
      c. maintaining the amount of molten cathodic reactant within said cathodic reaction zone such that said channels remain free of said molten reactant and are thus adapted to transport sulfur vapor.

2. A device in accordance with claim 1 wherein said porous conductive material is porous graphite felt and the felt in the region adjacent said barrier is coated with an oxide or sulfide of a metal selected from the group consisting of a) metals of Groups I, II and III of the Periodic Table of Elements b) Transition Series Metals and c) tin, lead antimony and bismuth.

3. A device in accordance with claim 2 wherein said coating on said graphite felt is selected from the group consisting of aluminum oxide, chromium oxide, molybdenum disulfide, lanthanum chromite, calcium doped lanthanum chromite and antimony pentoxide doped tin oxide.

4. A device in accordance with claim 1 wherein said channels contact a larger surface area of said porous conductive material in the region adjacent said cation-permeable barrier than they do in the region further removed from said barrier.

5. In a secondary battery or cell comprising:
   A. a container;
   B. a cation-permeable barrier to mass liquid transfer which is disposed within said container so as to create an anodic reaction zone within said barrier and a cathodic reaction zone between said barrier and said container;
   C. a molten alkali metal anodic reactant within said anodic reaction zone in electrical contact with an external circuit;
   D. a cathodic reactant comprising a liquid electrolyte which is electrochemically reversibly reactive with said anodic reactant and which, when said cell or battery is in at least a partially discharged state, is selected from the group consisting of (a) a single phase composition comprising molten polysulfide salts of said anodic reactant and (b) a two phase composition comprising molten sulfur and molten sulfur saturated polysulfide salts of said anodic reactant; and
   E. an electrode of porous conductive material which is disposed within said cathodic reaction zone, filled at least in part with said cathodic reactant and which is in contact with both said barrier and said external circuit, wherein the improvement comprises:
      a. employing a porous conductive material which will wick both sulfur and alkali metal polysulfides and which, in different regions of said cathodic reaction zone exhibits different degrees of wettability by said alkali metal polysulfide, said material in a region adjacent to said cation-permeable barrier being more readily wetted by said polysulfide than is said material in a region further removed from said barrier such that sulfur will boil near said barrier and condense away from it;
      b. disposing said porous conductive material within said cathodic reaction zone such that it forms and encloses one or more channels which extend from said region adjacent said barrier outwardly into said region of said cathodic reaction zone further removed from said barrier and adjacent said container; and
      c. maintaining the amount of molten cathodic reactant within said cathodic reaction zone such that said channels remain free of said molten reactant and are thus adapted to transport sulfur vapor.

6. A device in accordance with claim 5, wherein said cation-permeable barrier and said container are tubular.

7. A device in accordance with claim 6, wherein said channels comprise annular openings which are concentrically disposed around said tubular barrier.

8. A device in accordance with claim 7, wherein a plurality of said annular openings are spaced along the vertical axis of said battery or cell.

9. A device in accordance with claim 6 wherein said cell or battery has a vertical cross-section taken along the diameter of said battery or cell as indicated in FIG. 1.

10. A device in accordance with claim 6 wherein said cell or battery has a vertical cross-section taken along the diameter of said battery or cell as indicated in FIG. 3.

11. A device in accordance with claim 5, wherein said porous conductive material is porous graphite felt and the felt adjacent said cation permeable barrier is coated with an oxide or sulfide of a metal selected from the group consisting of (a) metals of Groups I, II and III of the Periodic Table of Elements; (b) Transition Series Metals; and (c) tin, lead, antimony and bismuth.

12. A device in accordance with claim 11, wherein said coating on said graphite felt is selected from the group consisting of aluminum oxide, chromium oxide, molybdenum disulfide, lanthanum chromite, calcium doped lanthanum chromite and antimony pentoxide doped tin oxide.

* * * * *